(12) United States Patent
Chung et al.

(10) Patent No.: US 10,007,046 B2
(45) Date of Patent: Jun. 26, 2018

(54) LIGHT GUIDE FILM, BACKLIGHT MODULE AND DISPLAY DEVICE HAVING THE SAME

(71) Applicants: RADIANT OPTO-ELECTRONICS (SUZHOU) CO. LTD., Wujiang, Jiangsu (CN); RADIANT OPTO-ELECTRONICS CORPORATION, Kaohsiung (TW)

(72) Inventors: Yuan-Chen Chung, Kaohsiung (TW); Wei-Hsuan Chen, Kaohsiung (TW)

(73) Assignees: RADIANT OPTO-ELECTRONICS (SUZHOU) CO., LTD., Suzhou (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 38 days.

(21) Appl. No.: 15/294,988

(22) Filed: Oct. 17, 2016

(65) Prior Publication Data

US 2017/0045664 A1 Feb. 16, 2017

Related U.S. Application Data

(63) Continuation-in-part of application No. PCT/CN2015/099804, filed on Dec. 30, 2015.

(30) Foreign Application Priority Data

Aug. 14, 2015 (CN) .......................... 2015 1 0501822

(51) Int. Cl.
    *F21V 8/00* (2006.01)
(52) U.S. Cl.
    CPC ................................ *G02B 6/0018* (2013.01)

(58) Field of Classification Search
    None
    See application file for complete search history.

(56) References Cited

U.S. PATENT DOCUMENTS 5,764,322 A * 6/1998 Mamiya ............... G02B 6/0031
                                                       349/113
2009/0059127 A1   3/2009 Nakamoto et al.
(Continued)

FOREIGN PATENT DOCUMENTS

CN    202561652 U    11/2012
CN    203324499 U    12/2013
(Continued)

OTHER PUBLICATIONS

PCT/CN2015/099804 International Search Report dated Apr. 28, 2016 (14 pages).
TW104129540 Taiwan Search Report dated Sep. 13, 2016 (2 pages).

*Primary Examiner* — Britt D Hanley
(74) *Attorney, Agent, or Firm* — Perkins Coie LLP

(57) ABSTRACT

A light guide film for use with a light source includes a light-transmissive substrate and a light-transmissive layer. The substrate includes a top surface, and a light-incident lateral surface adapted to be disposed adjacent to the light source. The layer is disposed on the top surface of the substrate and has a light-incident lateral surface aligned with the light-incident lateral surface of the substrate. The light-transmissive layer has an inclined surface that is opposite to the substrate and that extends away from the light-incident lateral surface of the layer and obliquely toward the top surface of the substrate. The layer has a refractive index different from that of the substrate.

19 Claims, 7 Drawing Sheets

(56) References Cited

U.S. PATENT DOCUMENTS

2010/0123858 A1\* 5/2010 Han .................... G02B 6/0036
  349/65
2015/0370001 A1 12/2015 Morozov et al.

FOREIGN PATENT DOCUMENTS

| CN | 104061489 A | 9/2014 |
| CN | 203909333 U | 10/2014 |
| JP | H09258030 A | 10/1997 |
| KR | 20140067471 A | 6/2014 |
| TW | 201310095 A | 3/2013 |
| TW | 201437725 A | 10/2014 |

\* cited by examiner

LIGHT GUIDE FILM, BACKLIGHT MODULE AND DISPLAY DEVICE HAVING THE SAME

CROSS-REFERENCE TO RELATED APPLICATION

This application is a bypass continuation-in-part application of International Application No. PCT/CN2015/099804 filed on Dec. 30, 2015, which claims priority of Chinese Patent Application No. 201510501822.2, filed on Aug. 14, 2015, the entire content of each of which is incorporated herein by reference.

FIELD

The present disclosure relates to an optical element, more particularly to a light guide film, and a backlight module and a display device having the same.

BACKGROUND

Referring to FIG. 1, a conventional light guide film 1 is adapted for use with a light source 2 for guiding light emitted therefrom. The conventional light guide film 1 has a substrate 11 having opposite top and bottom surfaces 111, 112. When the light emitted from the light source 2 enters the conventional light guide film 1, it will propagate within the conventional light guide film 1 by total internal reflection. The bottom surface 112 of the conventional light guide film 1 is usually formed with a plurality of microstructures (not shown) that are periodically arranged for altering the incident angle of the light at the top surface 111, so as to allow the light to exit the conventional light guide film 1 from the top surface 111. However, since the conventional light guide film 1 is relatively thin comparing to the size of the light source 2, part of the light emitted from the light source 2 will not enter the conventional light guide film 1 and result in energy loss.

SUMMARY

Therefore, certain embodiments of the present disclosure provide a light guide film that can alleviate at least one of the drawbacks of the prior arts. Such a light guide film may be adapted for use with a light source and include a light-transmissive substrate and a light-transmissive layer. The substrate includes a top surface and a light-incident lateral surface that is adapted to be disposed adjacent to the light source. The light-transmissive layer is disposed on the top surface of the substrate and has a light-incident lateral surface that is aligned with the light-incident lateral surface of the substrate. The light-transmissive layer has an inclined surface that is opposite to said substrate, and that extends away from the light-incident lateral surface of the light-transmissive layer and obliquely toward the top surface of the substrate. The light-transmissive layer has a refractive index different from that of the substrate.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
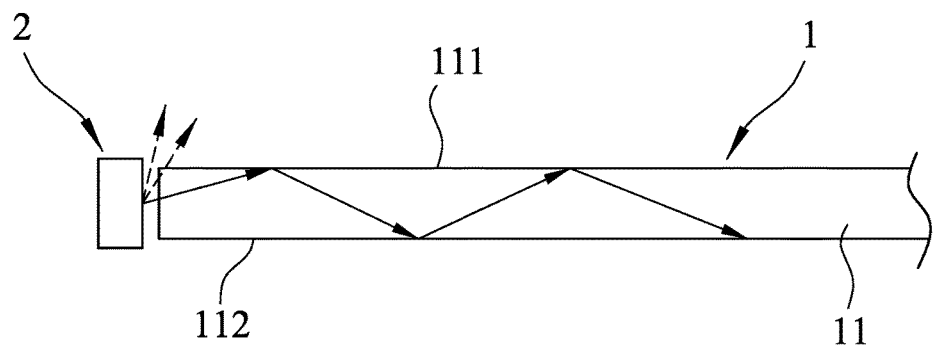
FIG. 1 is a schematic side view illustrating a conventional light guide film.

Before the disclosure is described in greater detail, it should be noted that like elements are denoted by the same reference numerals throughout the disclosure.

Figure 2:
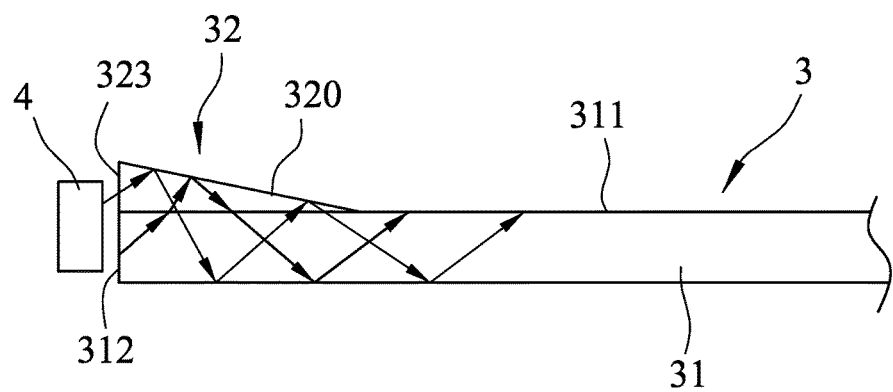
FIG. 2 is a schematic side view, illustrating a first exemplary embodiment of a light guide film according to the present disclosure.

Referring to FIG. 2, the first exemplary embodiment of a light guide film 3 is adapted for use with a light source 4 and includes a light-transmissive substrate 31 and a light-transmissive layer 32.

The substrate 31 of the first exemplary embodiment includes a top surface 311, and a light-incident lateral surface 312 that is adapted to be disposed adjacent to the light source 4. The substrate 31 may be made of a polymeric material, such as polycarbonate (PC) or polymethylmethacrylate (PMMA). The light-transmissive layer 32 is disposed on the top surface 311 of the substrate 31 and has a light-incident lateral surface 323 that is aligned with the light-incident lateral surface 312 of the substrate 31. The light-transmissive layer 32 has an inclined surface 320 that is opposite to the substrate 31 and that extends away from the light-incident lateral surface 323 of the light-transmissive layer 32 and obliquely toward the top surface 311 of the substrate 31. In certain embodiments, the light-transmissive layer 32 may be made from a UV-curable acrylate resin. In such embodiments, the light-transmissive layer 32 may be formed by distributing the UV-curable acrylate resin onto the substrate 31, shaping the UV-curable acrylate resin by a light-transmissible mold, and irradiating the same with UV light. As illustrated in FIG. 2, the top surface 311 of the substrate 31 may be partially covered by the light-transmissive layer 32.

Figure 3:
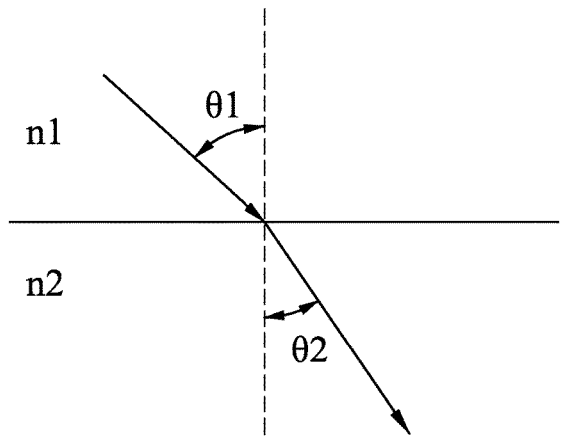
FIG. 3 is a schematic view illustrating the Snell's law.

In this embodiment, the light-transmissive layer 32 has a refractive index that is different from that of the substrate 31. It is known in the art that refraction may occur when light passes through an interface between two different media as illustrated in FIG. 3 and can be represented by the following formula (Snell's Law):

$$n_1 \sin \theta_1 = n_2 \sin \theta_2$$

wherein $n_1$ represents the refractive index of the first medium, $n_2$ represents the refractive index of the second medium, $\theta_1$ represents the incident angle of light, and $\theta_2$ represents the refracting angle of light. Accordingly, a critical angle $\theta_c$ for the occurrence of total internal reflection can be calculated as follows:

$$\theta_c = \sin^{-1}(n_2/n_1)$$

By using different first and second media with different refractive indices, the critical angle $\theta_c$ can be altered accordingly. As illustrated in FIG. 2, when part of the light emitted from the light source 4 and incident into the light guide film 3 via the lateral surface 323 of the light-transmissive layer 32, it is desired to have the total internal reflection occurred at the inclined surface 320 for reducing energy loss during light transmission within the light guide film 3. As such, the refractive indices of the light-transmissive layer 32 and the substrate 31 are the parameters that can be manipulated to generate the total internal reflection.

Figure 4:
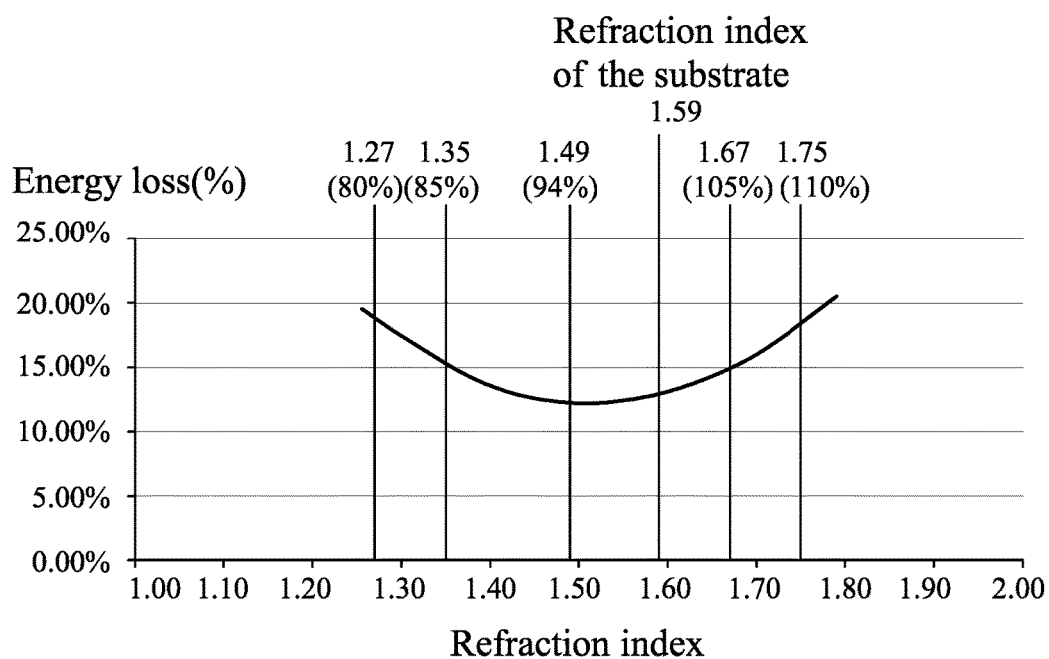
FIG. 4 is a graph of the first exemplary embodiment, illustrating the relationship among the refractive index of a light-transmissive substrate, the refractive index of a light-transmissive layer, and energy loss of the light guide film.

FIG. 4 shows the relationship among energy loss (%) during the light transmission within the light guide film 3 of the first exemplary embodiment and refractive indices of the substrate 31 and the light-transmissive layer 32. As illustrated in FIG. 4, when a ratio of the refractive index of the light-transmissive layer 32 to that of the substrate 31 becomes too small (<80%) or too large (>110%), the energy loss (%) will become significant (approximately 20%). In certain embodiments, the refractive index of the light-transmissive layer 32 is greater than or equal to 80% and is less than 100% of the refractive index of the substrate 31. In such embodiments, the refractive index of the light-transmissive layer 32 may be greater than or equal to 85% of the refractive index of the substrate 31 to achieve a relatively low energy loss (e.g., less than 15%). Similarly, in certain embodiments, the refractive index of the light-transmissive layer 32 is greater than 100% and is less than or equal to 110% of the refractive index of the substrate 31. In such embodiments, the refractive index of the light-transmissive layer 32 may be less than or equal to 105% of the refractive index of the substrate 31.

Figure 5:
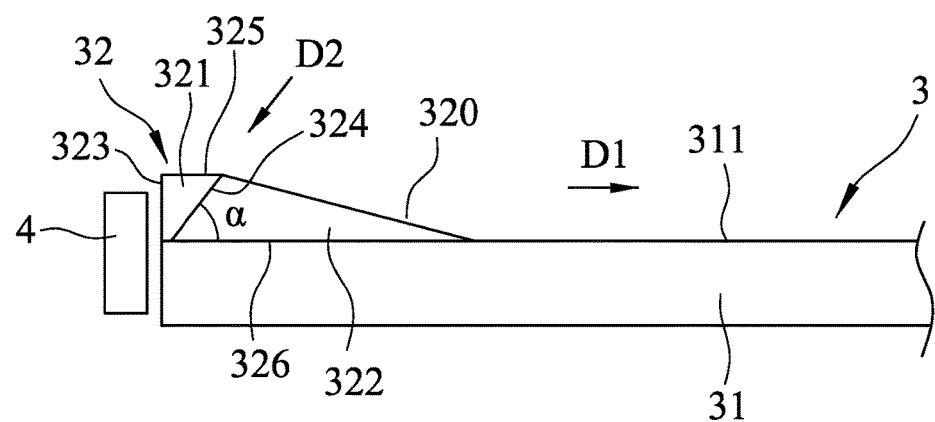
FIG. 5 is a schematic side view illustrating a second exemplary embodiment of the light guide film according to the present disclosure.
Figure 6:
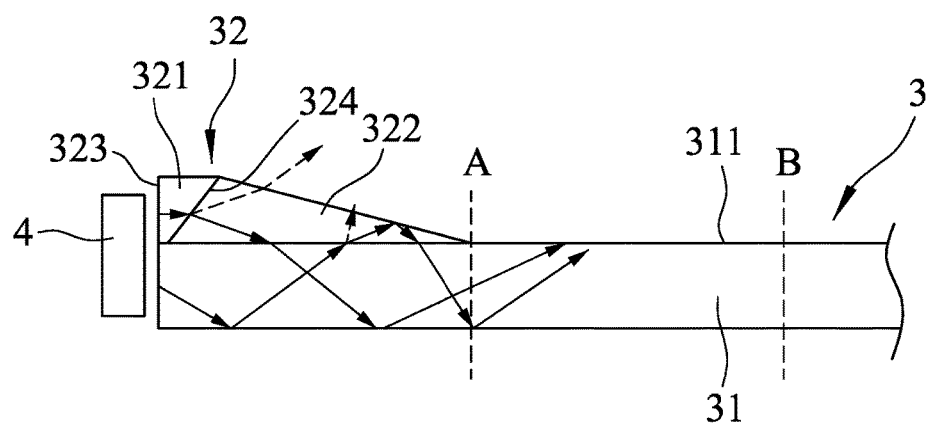
FIG. 6 is a schematic side view of the second exemplary embodiment illustrating propagation of light through the light guide film.

Referring to FIGS. 5 and 6, the second exemplary embodiment of the light guide film 3 according to the present disclosure is shown to be similar to that of the first exemplary embodiment, with the differences residing as follows. As illustrated in FIG. 5, the light-transmissive layer 32 of the second exemplary embodiment is configured to have a trapezoidal cross-section, and further has top and bottom horizontal surfaces 325, 326 interconnecting the light-incident lateral surface 323 and the inclined surface 320. In addition, the light-transmissive layer 32 includes a first region 321 that is adapted to be disposed adjacent to the light source 4, and a second region 322 that is in contact with and extends away from the first region 321 along a first direction (D1) of the substrate 31. In this embodiment, the light-incident lateral surface 323 of the light-transmissive layer 32 is formed on the first region 321, and the inclined surface 320 is formed on the second region 322 as illustrated in FIG. 5. In this embodiment, the first region 321 of the light-transmissive layer 32 has a contacting surface 324 that is in direct contact with the second region 322, that extends obliquely downward along a second direction (D2) from an intersecting line formed between the inclined surface 320 and the top horizontal surface 325, and that meets with the top surface 311 of the substrate 31. In this embodiment, the contacting surface 324 of the first region 321 meets with the top surface 311 of the substrate 31 at a line which is within an area defined by projecting the top horizontal surface 325 onto the top surface 311 of the substrate 31. To be specific, the contacting surface 324 of the first region 321 meets with the top surface 311 of the substrate 31 at a line which is defined by projecting a midline of the top horizontal surface 325 onto the top surface 311 of the substrate 31. In this embodiment, the first and second regions 321, 322 of the light-transmissive layer 32 have mutually-different refractive indices that are smaller than the refractive index of the substrate 31 and that are greater than the refractive index of air. In this embodiment, the refractive index of the first region 321 is smaller than that of the second region 322.

Figure 7:
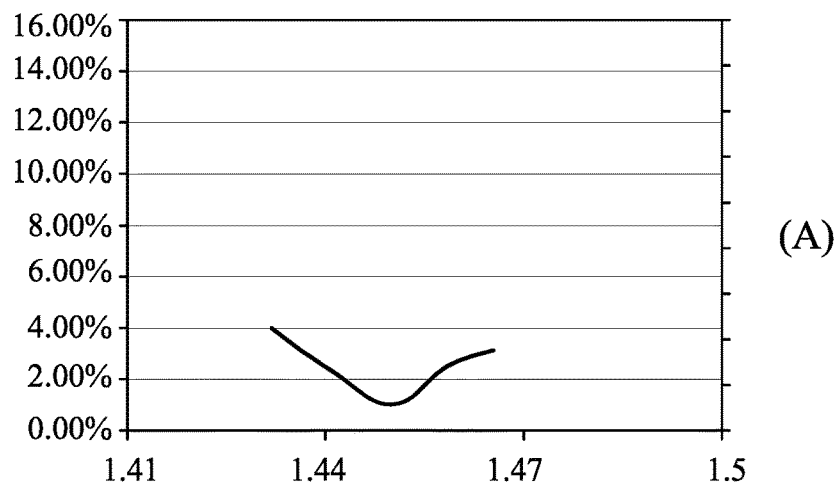
FIG. 7 is a graph of the second exemplary embodiment, illustrating the relationship between the refractive index of a first region of the light-transmissive layer and the energy loss at Location (A) of the light guide film.
Figure 8:
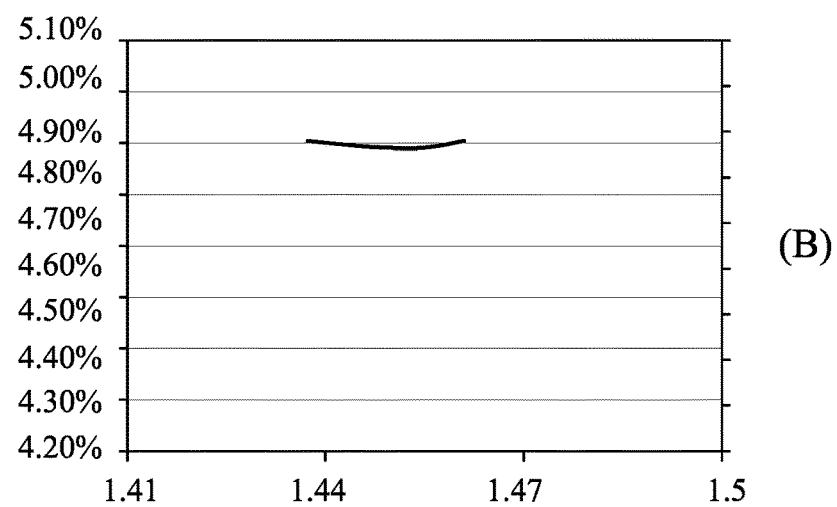
FIG. 8 is a graph of the second exemplary embodiment, illustrating the relationship between the refractive index of the first region of the light-transmissive layer and the energy loss at Location (B) of the light guide film.

FIGS. 7 and 8 are graphs illustrating the relationships between the refractive index of the first region 321 and the energy loss measured respectively at Locations (A) and (B) of the light guide film 3 as illustrated in FIG. 6, where the refractive index of the substrate 31 is 1.59, and the refractive index of the second region 322 is 1.45. It is clearly shown in FIGS. 7 and 8 that, when the refractive index of the first region 321 is about 1.45, the energy loss of the light guide film 3 is relatively low at both Locations (A) and (B).

Figure 9:
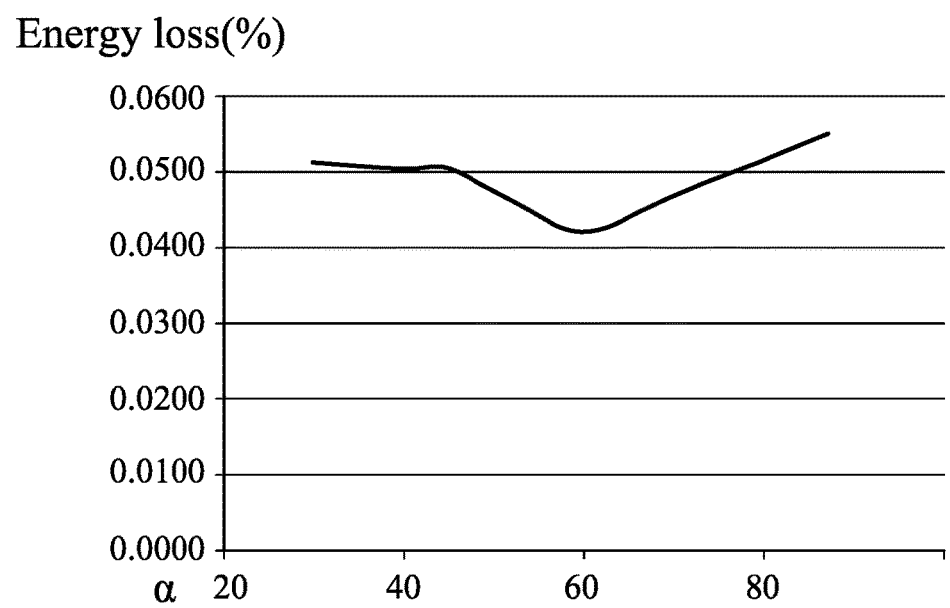
FIG. 9 is a graph of the second exemplary embodiment, illustrating the relationship between the energy loss of the light guide film and an angle between a contacting surface of the first region and the substrate.

FIG. 9 shows the relationship between the energy loss of the light guide film 3 of the second exemplary embodiment and an angle ($\alpha$) between the contacting surface 324 of the first region 321 and the top surface 311 of the substrate 31, where the substrate 31 has a refractive index of 1.59, the first region 321 has a refractive index of 1.45 and the second region 322 has a refractive index of 1.49. It is clearly shown that, when the contacting surface 324 has the angle ($\alpha$) ranging from 30° to 75°, the light guide film 3 has a relatively low energy loss.

Figure 10:
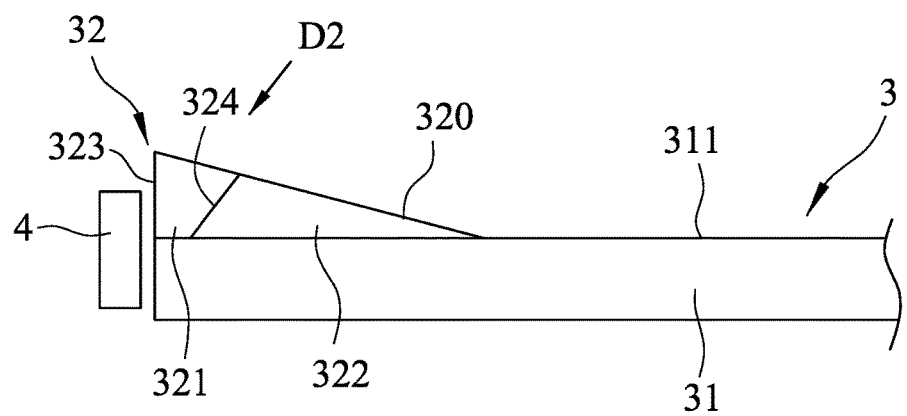
FIG. 10 is a schematic side view illustrating a third exemplary embodiment of the light guide film according to the present disclosure.

Referring to FIG. 10, the third exemplary embodiment of the light guide film 3 according to the present disclosure is shown to be similar to that of the first exemplary embodiment, with the differences residing as follows. The inclined surface 320 of the light-transmissive layer 32 of the third exemplary embodiment meets with the light-incident lateral surface 323, and the contacting surface 324 of the first region 321 meets with the inclined surface 320 of the light-transmissive layer 32. Specifically, the light-transmissive layer 32 is configured to have a triangular cross-section, and the contacting surface 324 of the first region 321 meets with the top surface 311 of the substrate 31. The light guide film 3 of the third exemplary embodiment has advantages similar to those of the second exemplary embodiment.

Figure 11:
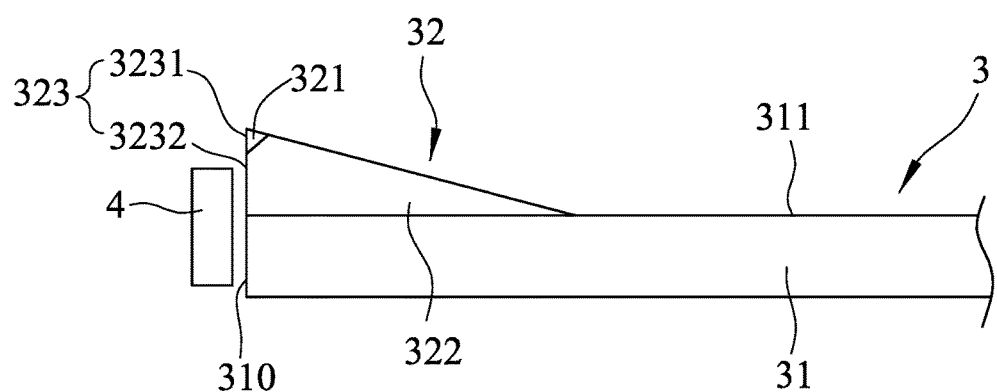
FIG. 11 is a schematic side view illustrating a fourth exemplary embodiment of the light guide film according to the present disclosure.

Referring to FIG. 11, the fourth exemplary embodiment of the light guide film 3 according to the present disclosure is shown to be similar to that of the third exemplary embodiment, with the differences residing as follows. The second region 322 of the light-transmissive layer 32 of the fourth exemplary embodiment is disposed between the first region 321 and the substrate 31. In addition, the light-incident lateral surface 323 of the light-transmissive layer 32 of the fourth exemplary embodiment has a first surface portion 3231 that is formed on the first region 321, and a second surface portion 3232 that is formed on the second region 322 and that is formed between the light-incident lateral surface 310 of the substrate 31 and the first surface portion 3231. By such configuration, part of light emitted from the light source 4 may transmit into the light guide film 3 via the second surface portion 3232 of the light-incident lateral surface 323. Since the refractive index of the second region 322 is greater than that of the first region 321, the critical angle between the second region 322 and the air is smaller than that between the first region 321 and the air, thus total internal reflection is relatively easy to occur between the second region 322 and the air in comparison to the first region 321 and the air. As such, the energy loss of the light guide film can be further reduced.

Referring back to FIGS. 2, 5, 6, 10 and 11, an exemplary embodiment of a backlight module according to the present disclosure may include the light source 4, and the aforesaid light guide film 3 as illustrated in either one of FIGS. 2, 5, 6, 10 and 11 for guiding the light emitted from the light source 4 toward a direction where the top surface 311 of the substrate 31 faces. In certain embodiments, the light guide film 3 has an overall thickness of not less than that of the light source 4, so as to ensure the light emitted from the light source 4 is substantially incident into the light guide film 3 via the light-incident lateral surfaces 312, 323 of the substrate 31 and the light-transmissive layer 32.

Figure 12:
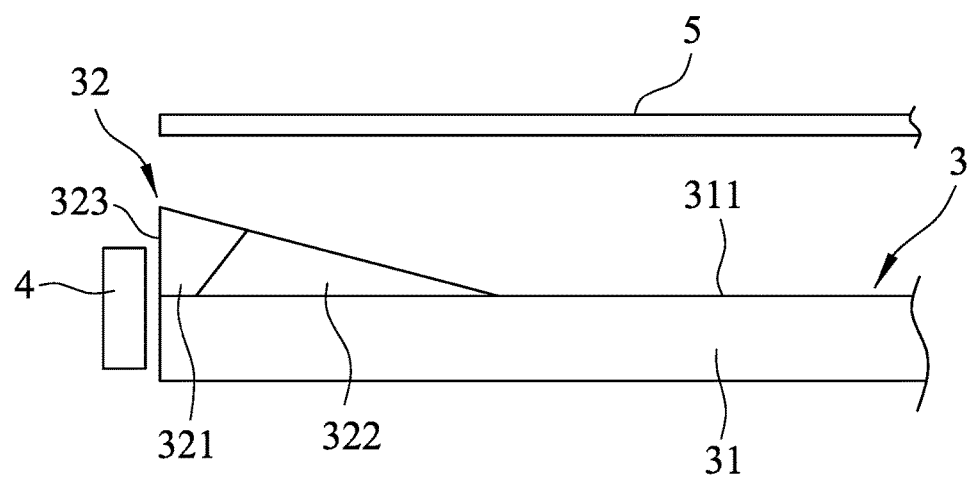
FIG. 12 is a schematic side view, illustrating one embodiment of a display device according to the present disclosure.

As illustrated in FIG. 12, one exemplary embodiment of a display device according to the present disclosure may include the backlight module, for instance, one as illustrated in FIG. 10 and a display panel 5 that is disposed to face the top surface 311 of the substrate 31, so as to receive the light exit from the top surface 311 of the light guide film 3 of the backlight module.

In summary, by virtue of the light-transmissive layer 32 having desirable refractive index value(s) and by virtue of the configuration of the light-transmissive layer 32, the energy loss of the light guide film 3 according to the present disclosure can be effectively reduced.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A light guide film adapted for use with a light source, comprising:
   a light-transmissive substrate including a top surface and a light-incident lateral surface that is adapted to be disposed adjacent to the light source; and
   a light-transmissive layer disposed on said top surface and having a light-incident lateral surface that is aligned with said light-incident lateral surface of said substrate, said light-transmissive layer having an inclined surface that is opposite to said substrate and that extends away from said light-incident lateral surface of said light-transmissive layer and obliquely toward said top surface of said substrate;
   wherein said light-transmissive layer has a refractive index different from that of said substrate;
   said light-transmissive layer includes a first region that is adapted to be disposed adjacent to the light source, and a second region that is in contact with and extends away from said first region along said substrate; and
   said first and second regions of said light-transmissive layer have mutually-different refractive indices that are smaller than the refractive index of said substrate and that are greater than a refractive index of air.

2. The light guide film according to claim 1, wherein the refractive index of said first region of said light-transmissive layer is smaller than that of said second region.

3. The light guide film according to claim 1, wherein said light-incident lateral surface of said light-transmissive layer is formed on said first region.

4. The light guide film according to claim 1, wherein said first region of said light-transmissive layer has a contacting surface that is in direct contact with said second region.

5. The light guide film according to claim 4, wherein:
   said light-transmissive layer is configured to have a trapezoidal cross-section and further has top and bottom horizontal surfaces interconnecting said light-incident lateral surface and said inclined surface; and
   said contacting surface of said first region extends obliquely downward from an intersecting line formed between said inclined surface and said top horizontal surface of said light-transmissive layer and meets with said top surface of said substrate.

6. The light guide film according to claim 5, wherein said contacting surface of said first region meets with said top surface of said substrate at a line which is defined by projecting a midline of said top horizontal surface onto said top surface of said substrate.

7. The light guide film according to claim 5, wherein said contacting surface of said first region meets with said top surface of said substrate at a line that is within an area defined by projecting said top horizontal surface onto said top surface of said substrate.

8. The light guide film according to claim 4, wherein said inclined surface meets with said light-incident lateral surface of said light-transmissive layer, and said contacting surface of said first region meets with said inclined surface of said light-transmissive layer.

9. The light guide film according to claim 8, wherein said light-transmissive layer is configured to have a triangular cross-section, and said contacting surface of said first region meets with said top surface of said substrate.

10. The light guide film according to claim 4, wherein said contacting surface of said first region has an angle relative to said top surface of said substrate ranging from 30° to 75°.

11. The light guide film according to claim 1, wherein said top surface of said substrate is partially covered by said light-transmissive layer.

12. A backlight module comprising:
    a light source; and
    said light guide film of claim 1 for guiding light emitted from said light source toward a direction where said top surface of said substrate faces.

13. The backlight module according to claim 12, wherein said light guide film has an overall thickness of not less than that of said light source.

14. A display device, comprising:
    said backlight module of claim 12; and
    a display panel that is disposed to face toward said top surface of said substrate.

15. A light guide film adapted for use with a light source, comprising:
    a light-transmissive substrate including a top surface and a light-incident lateral surface that is adapted to be disposed adjacent to the light source; and
    a light-transmissive layer disposed on said top surface and having a light-incident lateral surface that is aligned with said light-incident lateral surface of said substrate, said light-transmissive layer having an inclined surface that is opposite to said substrate and that extends away from said light-incident lateral surface of said light-transmissive layer and obliquely toward said top surface of said substrate;

wherein said light-transmissive layer has a refractive index different from that of said substrate;

said light-transmissive layer includes a first region, and a second region that is disposed between said first region and said substrate;

said light-incident lateral surface of said light-transmissive layer has a first surface portion that is formed on said first region, and a second surface portion that is formed on said second region and that is formed between said light-incident lateral surface of said substrate and said first surface portion; and said first and second regions of said light-transmissive layer have mutually-different refractive indices that are smaller than the refractive index of said substrate and that are greater than a refractive index of air.

16. The light guide film according to claim 15, wherein said top surface of said substrate is partially covered by said light-transmissive layer.

17. A backlight module comprising:
a light source; and
said light guide film of claim 15 for guiding light emitted from said light source toward a direction where said top surface of said substrate faces.

18. The backlight module according to claim 17, wherein said light guide film has an overall thickness of not less than that of said light source.

19. A display device, comprising:
said backlight module of claim 17; and
a display panel that is disposed to face toward said top surface of said substrate.

* * * * *